United States Patent
Deng et al.

(10) Patent No.: US 7,746,404 B2
(45) Date of Patent: Jun. 29, 2010

(54) DIGITAL CAMERA WITH PANORAMIC IMAGE CAPTURE

(75) Inventors: Yining Deng, San Mate, CA (US); Qian Lin, Santa Clara, CA (US); Jian Fan, Cupertino, CA (US); Pere Obrador, Mountain View, CA (US); Ullas Gargi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1335 days.

(21) Appl. No.: 10/705,188

(22) Filed: Nov. 10, 2003

(65) Prior Publication Data

US 2005/0099494 A1    May 12, 2005

(51) Int. Cl.
    *H04N 5/225* (2006.01)
(52) U.S. Cl. .......................... 348/360; 348/39; 348/36; 348/208.4; 348/208.5; 348/208.6; 348/208.13; 348/240.1
(58) Field of Classification Search ................. 348/360, 348/39, 36, 208.4, 208.5, 208.6, 208.13, 348/240.1
    See application file for complete search history.

(56) References Cited

U.S. PATENT DOCUMENTS

| 5,500,707 A * | 3/1996 | Yoshida ...................... 396/109 |
| 5,682,197 A * | 10/1997 | Moghadam et al. ........... 348/36 |
| 6,532,036 B1 | 3/2003 | Peleg et al. |
| 6,717,608 B1 * | 4/2004 | Mancuso et al. .............. 348/36 |
| 7,053,953 B2 * | 5/2006 | Belz et al. .................... 348/346 |
| 7,064,783 B2 * | 6/2006 | Colavin et al. ........... 348/231.3 |
| 2002/0126890 A1 | 9/2002 | Katayama et al. |
| 2003/0128891 A1 * | 7/2003 | Hoover et al. ............... 382/284 |

FOREIGN PATENT DOCUMENTS

| EP | 0734155 | 9/1996 |
| EP | 0884897 | 12/1998 |
| JP | 01251962 | 10/1989 |
| JP | 06121226 | 4/1994 |

* cited by examiner

*Primary Examiner*—Shawn An

(57) ABSTRACT

A method for generating a panoramic image that enables a user to obtain panoramic photographs with a digital camera without the aid of a computer system or specialized lenses. A digital camera according to the present techniques captures a series of image frames as a user pans the digital camera through a panoramic image scene and combines the captured image frames while the image frames are being captured.

19 Claims, 4 Drawing Sheets

FIG. 4A
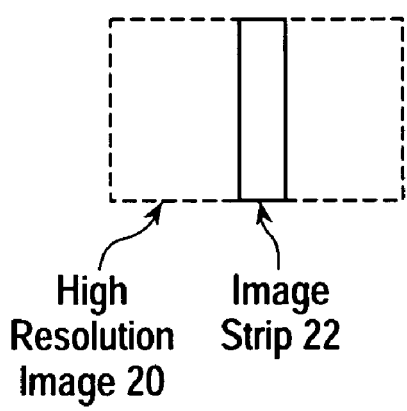
High Resolution Image 20 — Image Strip 22
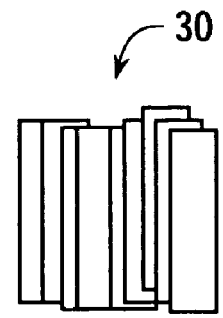
FIG. 4B
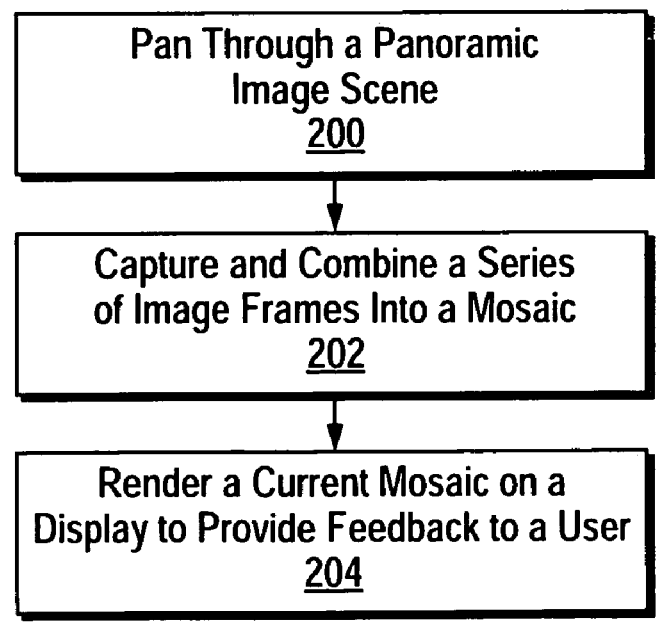
FIG. 5

DIGITAL CAMERA WITH PANORAMIC IMAGE CAPTURE

BACKGROUND

A panoramic image may be defined as an image that has a substantially wider view than the photographs captured by conventional cameras. For example, a panoramic image may have a width that encompasses many times the width of a conventional film camera or digital camera.

A panoramic image may be obtained by equipping a conventional film or digital camera with a lens structure that is capable of photographing a wide panoramic view. Unfortunately, the high cost of a panoramic lens structure may be out of reach of large numbers of users that desire to obtain panoramic photographs.

A panoramic image may be obtained using a specialized camera having a mechanism for rotating a camera lens systematically through a wide panoramic view. Unfortunately, such specialized cameras may also be too expensive for large numbers of users that desire panoramic photographs.

A panoramic image may be generated by using a digital camera to obtain multiple photographs of a desired scene and then using a computer to combine the obtained photographs into a panoramic photograph. Unfortunately, this method requires the use of a computer and specialized software.

SUMMARY OF THE INVENTION

A method for generating a panoramic image is disclosed that enables a user to obtain panoramic photographs with a digital camera without the aid of a computer system or specialized lenses. A digital camera according to the present techniques captures a series of image frames as a user pans the digital camera through a panoramic image scene and combines the captured image frames while the image frames are being captured.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 4a-4b illustrate a method for obtaining a panoramic image that takes advantage of the flexible addressing provided by an image sensor;

FIG. 5 shows a method for providing user feedback during acquisition of a panoramic image;

DETAILED DESCRIPTION

Figure 1:
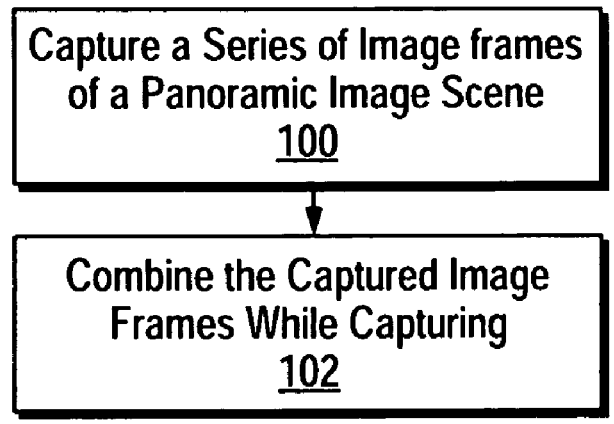
FIG. 1 shows a method of obtaining a panoramic image using a digital camera according to the present techniques.

FIG. 1 shows a method of obtaining a panoramic image using a digital camera according to the present techniques. The digital camera perform steps 100-102 as a user pans the digital camera through a desired panoramic image scene.

At step 100, the digital camera captures a series of image frames each a sample of a portion of the desired panoramic image scene. At step 102, the digital camera combines the captured image frames into a panoramic image while the series of image frames of the desired panoramic image scene continue to be captured.

The digital camera may provide a feedback to a user that indicates the progress of the panoramic image while performing steps 100-102. For example, visual or audio or other indicators may be used to indicate missing areas of a panoramic image being acquired or to indicate areas that need to be re-sampled.

The digital camera may automatically perform steps 100-102 in response to user-defined boundaries of the desired panoramic image scene. For example, the user may photograph edges of the desired panoramic image scene to define its boundaries for acquisition.

Figure 2:
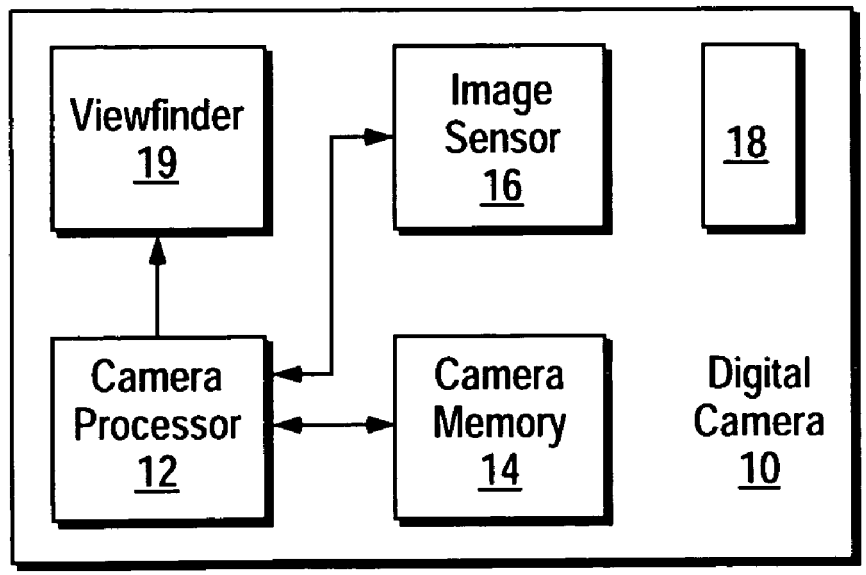
FIG. 2 shows a digital camera that incorporates the present teachings.

FIG. 2 shows a digital camera 10 that incorporates the present teachings. The digital camera 10 includes an image sensor 16, an camera processor 12, and a camera memory 14. The digital camera 10 includes a capture mechanism 18, e.g. a lens, shutter, aperture control, zoom, etc. that applies light from an image scene onto the image sensor 16. The digital camera 10 includes a viewfinder 19, e.g. an LCD display.

The digital camera 10 provides a panoramic image mode which is selectable by a user. For example, the digital camera 10 may include a particular button which when depressed by a user places the digital camera 10 in the panoramic image mode. In another example, a user may place the digital camera 10 in a panoramic image mode by pressing and holding a shutter button which may be used to capture photographs in a non-panoramic mode.

The camera processor 12 detects the user selection of the panoramic image mode and fixes a number of camera settings. For example, the exposure, zoom, and focus of the capture mechanism 18 may be fixed. While in the panoramic image mode the user sweeps the digital camera 10 through the desired panoramic image scene as the camera processor 12 samples the image sensor 16 and constructs a panoramic image.

In one embodiment, the image sensor 16 is capable of generating high-resolution image frames and low-resolution video image frames. The camera processor 12 may use both the high-resolution and video capabilities of the image sensor 16 to generate a panoramic image.

Figure 3:
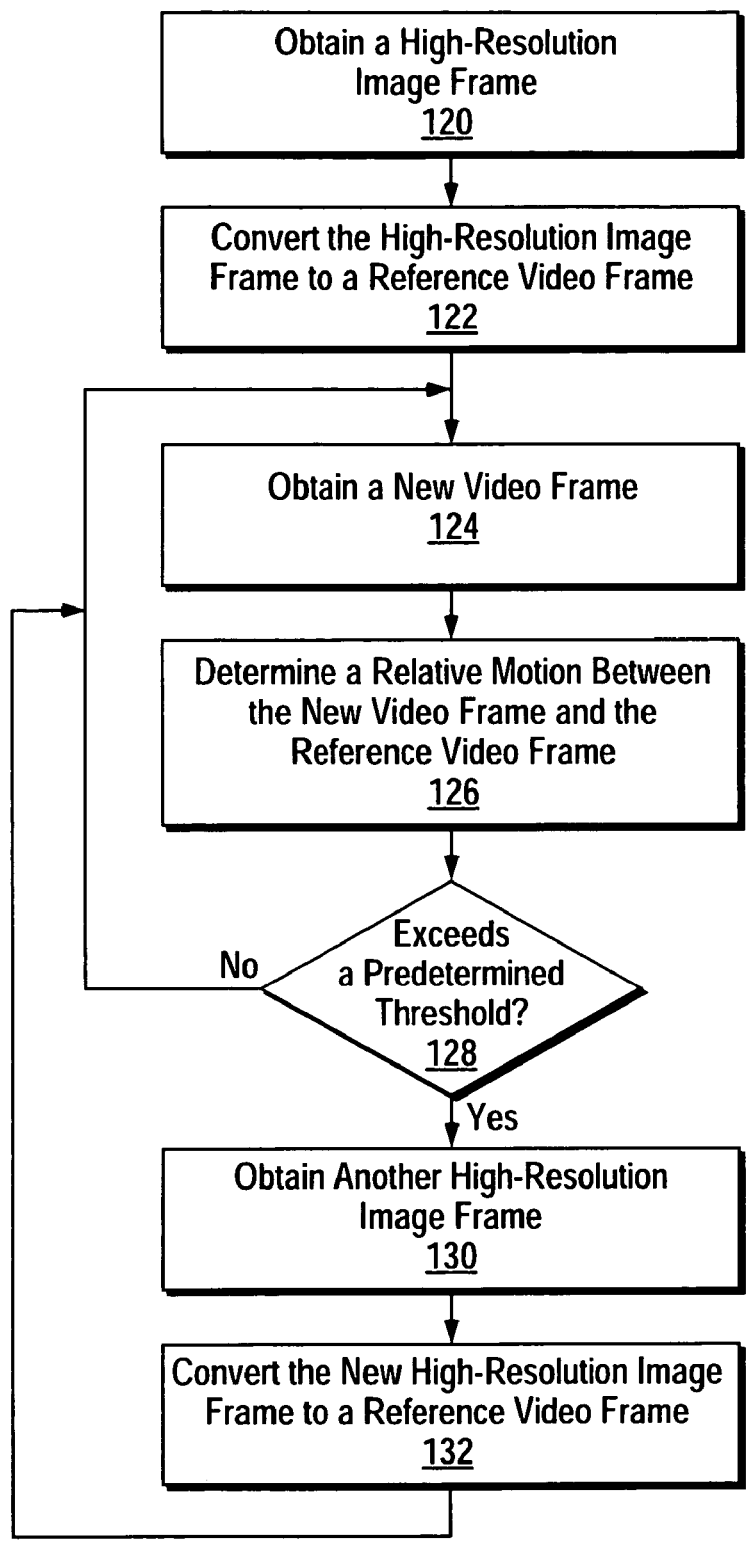
FIG. 3 shows a method of generating a panoramic image that employs the high-resolution and video capabilities of an image sensor.

FIG. 3 shows a method of generating a panoramic image that employs the high-resolution and video capabilities of the image sensor 16. At step 120, the user places the digital camera 10 into the panoramic image mode and the camera processor 12 uses the image sensor 16 to obtain a high-resolution image frame. The camera processor 12 stores the high-resolution image frame into the camera memory 14. For example, the high-resolution image frame at step 120 may be obtained when a user points the digital camera 10 at the leftmost boundary of a desired panoramic image scene and selects the panoramic image mode.

At step 122, the camera processor 12 converts the high-resolution image frame from step 120 to a reference video frame. For example, the camera processor 12 may down-sample the obtained high-resolution image frame from the full resolution of the image sensor 16 to a lower resolution video frame.

Steps 124-132 are performed in a loop as the user pans the digital camera 10 across the desired panoramic image scene. At step 124, the camera processor 12 uses the image sensor 16 to obtain a new video frame from the image sensor 16. At step

126, the camera processor 12 determines a relative motion between the reference video frame and the new video frame from step 124.

A variety of known methods may be employed at step 126 for determining the relative motion between a reference video frame and a new video frame. It may be preferable to employ a motion estimation method that takes into account global pixel information contained in the reference and new video frames. Step 126 yields a motion estimate for the new video frame.

At step 128, if the motion estimate from step 126 exceeds a predetermined threshold value then the camera processor 12 proceeds to step 130. At step 130, the camera processor 12 uses the image sensor 16 to obtain another high-resolution image frame and stores it into the camera memory 14 along with the motion estimate from step 126. Then at step 132, the camera processor 12 converts the high-resolution image frame from step 130 to a reference video frame, e.g. by down-sampling, and it becomes a new reference video frame for another iteration back at step 124.

At step 128, if the motion estimate from step 126 does not exceed a predetermined threshold value then the camera processor 12 proceeds back to step 124 to obtain a new video frame.

After the user finishes panning the digital camera 10 through the desired panoramic-image scene the camera processor 12 stops acquiring image frames. For example, the user may release the shutter button to stop acquisition. At that point, the camera memory 14 stores a set of high-resolution image frames captured from the desired panoramic image scene. The camera memory 14 also holds the motion estimates that indicate the relative positions of the captured high-resolution image frames. The camera processor 12 uses this information to construct a panoramic image.

A variety of known techniques may be employed to combine the high-resolution image frames obtained at steps 120 and 130 into a panoramic image. Examples include methods for constructing a mosaic by "stitching" together the high-resolution image frames. These methods may include detecting overlapping areas in adjacent high-resolution image frames. The motion estimates generated during the capturing process may serve as initial estimates of the relative positions of the obtained high-resolution image frames when creating a mosaic, thereby improving the quality of a resulting panoramic image when compared with the creation of a mosaic without the initial estimates.

The steps of stitching together obtained image frames may be performed while additional image frames are being acquired. For example, step 130 may include the sub-steps of refining the motion estimation from step 126 and stitching acquired image frames.

Storage space in the camera memory 14 may be conserved by storing only portions of the acquired image frames. For example, the camera processor 12 may use the motion estimates from step 126 to determine an overlap between the corresponding image frames. The camera processor 12 can retain the entire non-overlapping area and a small portion of the overlapping area of a stored image frame and discard the remainder of the image frame from the camera memory 14.

In an embodiment in which the size of the camera memory 14 is relatively small the acquired image frames may not be stored. Instead, the camera processor 12 stitches together the image frames as they are acquired and then discards them. If the acquired image frames are not stored then the process of stitching them into a panoramic image occurs in the temporal order of image frame acquisition. On the other hand, if the acquired image frames are stored then they may be stitched into a panoramic image in any order.

FIG. 4a-4b illustrate a method for obtaining a panoramic image that takes advantage of the flexible addressing provided by, for example, a CMOS image sensor. In this method, the image sensor 16 enables the camera processor 12 to read an image strip 22 of a high-resolution image frame 20. The camera processor 12 is capable of reading the image strip 22 at a relatively high frame rate in comparison to the frame rate at which the high-resolution image frame 20 may be read due to the relative amounts of data involved.

In one embodiment, the high-resolution image frame 20 includes 3M pixel sensors arranged as 2000 pixels horizontally and 1500 pixel vertically. The image strip 22 is a strip that includes 205 pixels horizontally and 1500 pixel vertically. The camera processor 12 is capable of reading the image strip 22 at 30 frames/sec. This enables the camera processor 12 to sample an image scene using the image strip 22 at the rate of VGA video while yielding the full 1500 pixel vertical resolution of the image sensor 16.

The relatively high sampling rate of the image strip 22 enables the camera processor 12 to acquire a set of image strips 30 as a user of the digital camera 10 pans through a desired panoramic image scene. The camera processor 12 may stitch together the image strips 30 as they are acquired or may store the image strips 30 and stitch them together in a subsequent step.

Given that the image strips 30 are each obtained in 1/30 of a second it is likely that the relative motion between adjacent strips is relatively small. As a consequence, when combining adjacent image strips a translational motion model may be employed with no motion refinement. Only minimal warping may be needed to align adjacent strips because the changes to the adjacent strips are likely to be relatively small given the relatively high sampling rate. The non-overlapping portion of each new strip may be added to the current mosaic as the user pans the digital camera 10.

The dimensions of the image strip 22 may be adapted to the rate at which the user moves the digital camera 10 when panning. For example, the width of the image strip 22 may be increased in response to a faster movement of the digital camera 10, thereby maintaining a sufficient overlap among the obtained image strips 30. Conversely, the width of the image strip 22 may be decreased in response to a slower movement of the digital camera 10.

The above techniques obviate the need to employ a computer system to stitch together captured images into a panoramic image as in the prior art. In addition, prior techniques may require a user to take steps to ensure that sufficient overlap exists in the captured images. In contrast, the present techniques enable a user to employ or more natural panning movement that is accommodated by the relatively fast frame rate and judicious use of full resolution images as set forth above. The present techniques enable a user to perform a single click of a camera button and then a smooth pan.

FIG. 5 shows a method for providing user feedback during acquisition of a panoramic image. At step 200, the user places the digital camera 10 in the panorama image mode and pans through a desired panoramic image scene. At step 202, the camera processor 12 while in the panorama image mode captures a series of image frames using the image sensor 16 and combines the acquired image frames into a mosaic. Each acquired image frame may be stitched by finding the best stitch given all of the previously acquired image frames or given the previous N image frames.

At step 204, the camera processor 12 renders the current mosaic onto a display to provide feedback to the user. The current mosaic indicates to the user the progress of the current panoramic image. The current mosaic may be rendered onto the viewfinder 19, e.g. by overlaying with the current view, or may be rendered on a separate display (not shown) of the digital camera 10. A scrolling mechanism may be employed that enables the user to scroll through the current mosaic if the viewfinder 19 or separate display is not capable of displaying a complete panoramic image.

The camera processor 12 in one embodiment determines an uncertainty of each estimated pixel in the current mosaic and highlights the pixels whose uncertainty exceeds a predetermined threshold. The highlighted pixels prompt the user to revisit the indicated areas so that the camera processor 12 can capture additional data and complete those areas of the mosaic. The camera processor 12 may use the stored image frames in the camera memory 14 to detect the movement of the digital camera 10 back to an area that requires additional data and then samples those areas accordingly.

In one embodiment, the user of the digital camera 10 sets the horizontal and/or vertical limits of a desired panoramic image by aligning the viewfinder 19 at each limit and capturing a boundary image. The user then puts the digital camera 10 in the panoramic image mode and pans through the desired panoramic image scene as the camera processor 12 acquires and stitches together image frames. The camera processor 12 uses the boundary images to determine when to stop capturing image frames. For example, the camera processor 12 stops capturing image frames in a rightward pan when a captured image frame substantially matches the right boundary image initially captured by the user. The camera processor 12 may highlight un-captured areas of the current mosaic on a display to a user and then de-highlight those areas after capture as the user sweeps the areas.

The exposure settings of the digital camera 10 may be fixed in its panoramic image mode. A fixed exposure may cause blurring in the captured images. The camera processor 12 may use motion estimation or a blur detection filter to detect when the user is moving the digital camera 10 too fast during panoramic image mode and signal the user, e.g. through a visual display or other mechanism. In some embodiments, the digital camera 10 may include a motion sensor, e.g. a gyroscope, that may be used to detect when the user is moving the viewfinder too fast.

Alternatively, the exposure of the camera 10 may be set as automatic in the panorama mode. The exposure adapts to lighting conditions which may vary substantially from shadow to brightly lit areas. The relative lighting changes between image strips may be relatively minor and correctable in the camera processor 10. The acquisition of image strips as taught herein enables a relaxation in exposure constraints that may be imposed in prior cameras.

Figure 6:
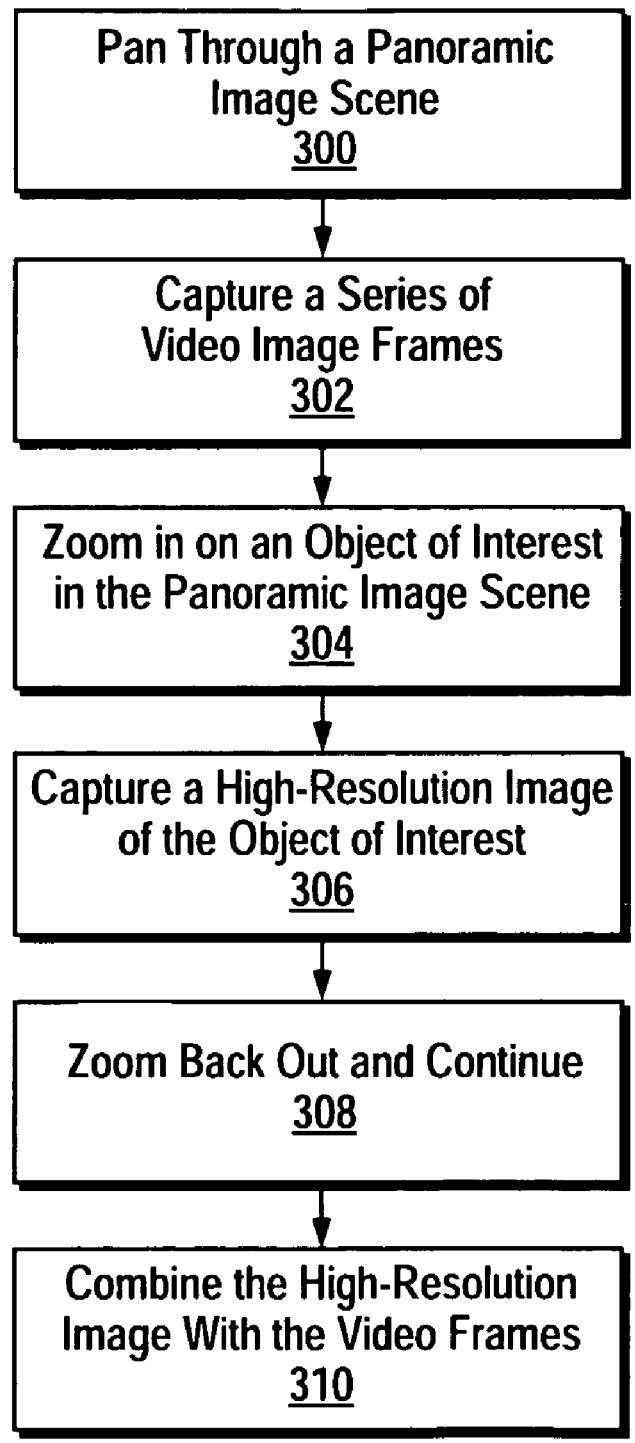
FIG. 6 shows a method for generating a panoramic image that provides enhanced resolution of an object of interest.

FIG. 6 shows a method for generating a panoramic image that provides enhanced resolution of an object of interest. At step 300, the user places the digital camera 10 in the panorama image mode and pans through a desired panoramic image scene. At step 302, the camera processor 12 while in the panorama image mode captures a series of video image frames using the image sensor 16. At step 304, the user stops panning and zooms in on an object of interest. For example, the user may employ a zoom button on the digital camera 10 to zoom in on, for example, a persons face. In some embodiments, the camera processor 12 may limit the zoom to a fixed zoom sequence. At step 306, the camera processor 12 captures a high resolution image of the object of interest using the image sensor 16. At step 308, the user zooms back out from the object of interest and continues to pan while the camera processor 12 obtains video image frames using the image sensor 16.

The camera processor 12 records a set of metadata associated with the zoom sequence on the object of interest. The metadata may include the frame number/time stamp for the start of the zoom in, a frame number/time stamp for the stable high-resolution capture on the object of interest, and a frame number/time stamp for the zoom out. The meta data is used at step 310 to combine the high-resolution image from step 306 with the video frame samples of the remainder of the panoramic image. The stitching together of a mosaic at step 310 may include down-sampling of the high-resolution image obtained at step 306.

The zoomed areas may be areas containing details of high interest. In such cases, the acquired images may be up-sampled as they are acquired in the details of interest may be saved. The up-sampling may be performed using a variety of methods, e.g. bilinear scaling or methods based on image content.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for generating a panoramic image; comprising:
   a camera capturing a series of image frames each of a portion of a panoramic image scene;
   said camera combining the image frames into a panoramic image while said camera is capturing said series of image frames; wherein said capturing comprises
   said camera capturing a first image frame having a resolution that corresponds to a resolution of the panoramic image; and
   said camera capturing a second image frame having a resolution that corresponds to the resolution of the panoramic image if a relative motion between the first and second image frames is detected.

2. The method of claim 1 further comprising said camera determining the relative motion by capturing a series of image frames having a resolution that is lower than the resolution of the panoramic image.

3. The method of claim 2 wherein the lower resolution is selected to maintain an overlap in the image frames having the lower resolution in response to the relative motion.

4. The method of claim 1 further comprising said camera detecting the relative motion using a motion sensor.

5. The method of claim 4 further comprising said camera discarding an overlapping portion of one of the first and second image frames from the memory.

6. The method of claim 1 wherein combining comprises combining the first and the second image frames in response to the relative motion.

7. The method of claim 1 further comprising said camera capturing a set of image frames that define a set of boundaries of the panoramic image.

8. The method of claim 1 further comprising:
   said camera performing a zoom in on an object of interest in the panoramic image;
   said camera capturing an image frame that provides a sample of the object of interest such that the image frame of the object of interest has a higher resolution than the image frames obtained from a remainder of the panoramic image;

said camera recording a set of metadata pertaining to the zoom; and said camera combining the image frame of the object of interest with the remainder of the panoramic image in response to the metadata.

9. A method for generating a panoramic image, said method comprising:

a camera capturing a series of image frames each of a portion of a panoramic image scene; and said camera combining the image frames into a panoramic image while the series of image frames is being obtained and providing a visual feedback to a user that indicates the progress of the panoramic image wherein providing a visual feedback comprises providing a depiction of areas of the panoramic image that need to be re-sampled.

10. The method of claim 9, wherein providing a visual feedback comprises said camera providing a depiction of missing areas of the panoramic image.

11. A camera comprising:

image sensor for capturing a series of image frames each of a portion of a panoramic image scene including a first image frame having a resolution that corresponds to a resolution of a panoramic image and a second image frame having a resolution that corresponds to the resolution of said panoramic image; and processor that combines the first and second image frames into the panoramic image while the series of image frames is being obtained if a relative motion between the first and second image frames is detected.

12. The camera of claim 11, wherein the image frames include one or more image frames having a resolution that corresponds to a resolution of the panoramic image and one or more image frames having a resolution that is lower than the resolution of the panoramic image.

13. The camera of claim 11 wherein the processor determines the relative motion.

14. The camera of claim 11 further comprising a motion sensor.

15. The camera of claim 11 further comprising a memory for storing portions of the image frames for the panoramic image.

16. The camera of claim 11 wherein the image frames each comprise a strip of the panoramic image scene.

17. The camera of claim 11 further comprising means for providing a visual feedback to a user that indicates the progress of the panoramic image.

18. The camera of claim 11 further comprising means for performing a zoom in on an object of interest in the panoramic image such that the image sensor captures an image frame of the object of interest having a higher resolution than the image frames obtained from a remainder of the panoramic image and the processor records a set of metadata pertaining to the zoom.

19. The camera of claim 18 wherein the processor combines the image frame of the object of interest with the remainder of the panoramic image in response to the metadata.

* * * * *